(12) United States Patent
Collias

(10) Patent No.: US 8,061,773 B2
(45) Date of Patent: Nov. 22, 2011

(54) CHILD SAFETY SEAT SUPPORT APPARATUS

(75) Inventor: Constantine Dean Paul Collias, Kings Mountain, NC (US)

(73) Assignee: Crown Village, LLC, Kings Mountain, NC (US)

(*) Notice: Subject to any disclaimer, the term of this patent is extended or adjusted under 35 U.S.C. 154(b) by 197 days.

(21) Appl. No.: 12/335,457

(22) Filed: Dec. 15, 2008

(65) Prior Publication Data
US 2009/0102257 A1   Apr. 23, 2009

Related U.S. Application Data

(63) Continuation-in-part of application No. 10/892,703, filed on Jul. 15, 2004, now Pat. No. 7,464,990.

(51) Int. Cl.
*A47D 1/10* (2006.01)
(52) U.S. Cl. ............ 297/256.16; 297/423.38; 297/423.4
(58) Field of Classification Search ............ 297/256.15, 297/423.38, 423.4, 423.19, 423.11
See application file for complete search history.

(56) References Cited

U.S. PATENT DOCUMENTS

| | | |
|---|---|---|
| 1,501,443 A | 7/1924 | Ellis |
| 1,688,225 A | 10/1928 | Belohlavek |
| 2,308,315 A | 1/1943 | Smith |
| 2,777,502 A | 1/1957 | Travis |
| 3,207,552 A | 9/1965 | Loughney, Jr. |
| D264,788 S | 6/1982 | Blanchard |
| 4,728,151 A | 3/1988 | Neufeld |
| 4,874,203 A | 10/1989 | Henley |
| 5,228,745 A | 7/1993 | Hazel |
| D341,969 S | 12/1993 | Kroah |
| 5,332,292 A | 7/1994 | Price et al. |
| 5,385,385 A | 1/1995 | Silverman |
| 5,395,157 A | 3/1995 | Rollo et al. |
| 5,505,519 A | 4/1996 | Natt |
| 5,518,293 A * | 5/1996 | Coy et al. ................. 297/256.15 |

(Continued)

FOREIGN PATENT DOCUMENTS
DE           4137599           5/1993
(Continued)

OTHER PUBLICATIONS

RECTECH; Child Seat Leg Support; accessed at http://rectech.ncpad.org/equipments/index.php?; description last updated Jan. 10, 2006; 1 page.

*Primary Examiner* — Anthony D Barfield
(74) *Attorney, Agent, or Firm* — Summa, Additon & Ashe, P.A.

(57) ABSTRACT

A support apparatus for a child's safety seat allows the user to adjust the tilt of the safety seat while maintaining a child in a safe position. The support apparatus comprises a base portion, an upper portion connected to one end of the base portion, and a bottom portion connected to an opposite end of the base portion. The upper and bottom portions may be attached to the base by adjustable hinges, or they may be attached in a fixed position. A foot support is attached to the bottom portion. The bottom portion engages the floor of a vehicle for added support. The bottom portion further includes protective braces extending from the bottom portion and running vertically along its length. Multiple protective braces create channels in which children place their legs on foot supports within each channel. A child safety seat adapted to receive the invention is also disclosed.

22 Claims, 11 Drawing Sheets

U.S. PATENT DOCUMENTS

| | | | |
|---|---|---|---|
| 5,820,215 A | 10/1998 | Dreisbach | |
| 5,829,834 A | 11/1998 | Silverman | |
| 5,997,085 A | 12/1999 | MacLiver | |
| 6,170,911 B1 | 1/2001 | Kassai et al. | |
| 6,173,980 B1 * | 1/2001 | Newbold et al. | 297/256.16 X |
| 6,264,278 B1 | 7/2001 | Weimer et al. | |
| 6,267,441 B1 | 7/2001 | Otero | |
| 6,336,682 B1 | 1/2002 | Rosko | |
| 6,474,744 B1 | 11/2002 | Taylor et al. | |
| 6,796,606 B2 | 9/2004 | Marshall | |
| 6,817,665 B2 | 11/2004 | Pacella et al. | |
| 6,860,557 B2 | 3/2005 | Jonasson | |
| 7,036,838 B2 | 5/2006 | Leffler | |
| 7,073,859 B1 | 7/2006 | Wilson | |
| 7,097,245 B2 | 8/2006 | Barker | |
| 7,246,855 B2 | 7/2007 | Langmaid et al. | |
| 7,328,948 B2 | 2/2008 | Konig et al. | |
| 7,364,213 B2 | 4/2008 | Romolo | |

FOREIGN PATENT DOCUMENTS

| | | |
|---|---|---|
| EP | 1 953 033 | 8/2008 |
| WO | 03/055717 A1 | 7/2003 |

\* cited by examiner

CHILD SAFETY SEAT SUPPORT APPARATUS

CROSS REFERENCE TO RELATED APPLICATIONS

This application is a continuation-in-part of and claims priority to U.S. patent application Ser. No. 10/892,703 (Collias) filed on Jul. 15, 2004 now U.S. Pat. No. 7,464,990.

FIELD OF THE INVENTION

The present invention relates to a child safety seat support apparatus and protective structures thereon for making a child safer during vehicle transportation. The invention particularly relates to cushioning and shock absorbing features on the apparatus for enhancing the safety and comfort of a child positioned in the safety seat.

BACKGROUND

Almost all modes of transportation include seats for drivers or passengers. Most vehicle seats include a horizontal section for supporting an occupant's lower back and upper legs. A substantially vertical portion supports the occupant's back. Seats that are used in cars, trucks, and airplanes also typically include a restraint system (e.g., seat belts) to secure the occupant during rapid deceleration (i.e., collision).

The majority of seats found in cars, trucks, and airplanes are designed for adult passengers. These seats are unsuitable and unsafe for infants and small children. Accordingly, most, if not all states, have passed laws requiring transport of children in seats designed specifically for infants and children. This legal requirement has expanded the market for children's car seats.

Children's car seats typically are of three types, although there are numerous variations of each. The first is the infant car seat. Infant car seats are cradle-like structures that rest on the lower portion of the seat. Infant car seats are usually designed as inserts that can be easily removed from the car without removing the child from the car seat. Infant car seats are held in place by the car's seat belt system or by an anchor system installed in the vehicle seat. Infant car seats have a self-contained restraint system that secures the infant into the seat. Children up to about twenty pounds sit in an infant seat that is usually installed so that the child faces the rear of the car.

The second kind of child safety seat is the forward facing seat that holds children that weigh between about twenty and forty pounds. This seat is also held in place by the vehicle's seat belt system or possibly by anchors that are installed within the vehicle seat.

The third kind of car seat is the booster seat. This type of seat is designed for children that are too large for other safety seats but are not big enough to safely sit in a standard vehicle seat without extra support. A booster seat is typically formed in the shape of a small seat with a lower portion that is generally parallel to the lower portion of the underlying seat and a back support that is generally parallel to the back support of the underlying seat. The booster seat lifts the child up and away from the underlying seat to a position where the child can be safely restrained by the car's seat belt system. The booster seat may or may not be attached to the underlying seat. Booster seats hold children that typically weigh between forty and eighty pounds.

One problem that exists with child safety seats is that current designs tend to have the child sitting in an upright position where the child's back is close to vertical. Although an upright position can be beneficial in many ways, children often fall asleep during car trips. If the child's back is close to vertical and the child falls asleep, the child's head may fall forward and restrict the child's airway.

Another problem that exists with child safety seats is that current designs lack adequate adjustable foot support. This results in discomfort and possible loss of blood circulation in the child's legs on long automobile trips.

For example, U.S. Pat. No. 2,308,315 to Smith discusses a booster type car seat for a child. The seat includes a padded seat portion, an adjustable back rest, and an adjustable foot rest. The back rest and the foot rest may be adjusted to place the child in a reclined position.

Although the Smith seat is capable of placing a child in a reclined position and provides a foot rest, Smith fails to disclose a brace member extending from the foot rest to the floor of the automobile. The Smith seat, therefore, has no support on the bottom.

Another example is U.S. Pat. No. 4,874,203 to Henley. The Henley '203 patent discusses a vehicle passenger seat for handicapped persons. The embodiments shown in the patent are primarily designed for adults. The seats comprise a rigid seat and back portion with an adjustable foot rest extending from the seat portion. The seats discussed in Henley are rigid in nature and cannot be reclined. Furthermore, the adjustable foot rest is not described as reaching the floor to provide a point of support for the seat.

Yet another example is U.S. Pat. No. 5,228,745 to Hazel. The Hazel '745 patent discusses an insert for a child or infant car seat having a back portion, a seat portion and a leg portion. The back portion and the seat portion may be hinged together or rigidly joined. The seat portion and the leg portion, however, are rigidly fixed in each embodiment. The leg portion is not designed to reach all the way to the floor of a vehicle or provide support for the seat and back portions.

U.S. Pat. No. 6,264,278 to Weimer, et al. is directed to an adjustable foot rest for a car seat. The foot rest is preferably attached to a child's car seat via a hinge. The foot rest includes a vertical plate depending from the hinge and a second plate attached to the vertical plate via a dowel structure. A third plate upon which a child's feet rest is attached to the second plate. The dowel structure slides up and down the vertical plate and is secured by placing the dowel in various holes along the length of the vertical plate. The Weimer foot rest is not designed to make contact with the floor of a vehicle or provide an additional means of support for the child seat. Likewise, the Weimer foot rest is incapable of providing the means to adjust the angle of the car seat's backrest.

Along these lines, U.S. Pat. No. 6,170,911 to Kassai is directed to an infant's car seat or a seat for a very small child. The seat includes an upper base section and a lower base section with an adjustment means connecting the two sections. The adjustment means is designed to change the angle of inclination of a car seat and the child within the seat. The seat is designed to allow the positioning of a child in a substantially horizontal orientation. Although the Kassai seat provides for the horizontal positioning of a child, thus preventing the child's head from falling forward during sleep, the Kassai seat is directed toward infants and very small children. The Kassai seat fails to disclose any means of foot support that would be necessary or desirable for an older child. Likewise, the Kassai seat fails to disclose or suggest the use of a foot support as means of providing support or adjustment of a car seat.

Yet another example is U.S. Pat. No. 6,336,682 to Rosko. The Rosko '682 patent is directed to a child vehicle seat with a shoulder strap guide. The seat includes a molded plastic seat shell formed to include a seat portion having a back edge and a back support portion coupled thereto. The back support portion has a u-shaped perimeter and a plurality of tabs extending from an outer leg of the u-shaped perimeter. The tabs cooperate with the perimeter to form channels adapted to receive a shoulder portion of a seat belt. The Rosko '682 patent fails to teach or suggest, however, the use of a foot support as a mechanism for providing support or adjustment of a car seat.

U.S. Pat. No. 5,997,085 to MacLiver also discloses a child's safety seat, particularly for accommodating more than one child. The seat can be provided with a back portion and a base portion which are sub-divided to provide a plurality of individual seats. The seat may be provided with adjustable support legs that bear down on the inner sills of a motor vehicle to provide additional rigidity and support. The MacLiver '085 patent further provides a rearward-facing seat in a semi-reclined position for small children. The MacLiver '085 patent fails to teach, however, the adjustability of the seat portion to a reclining position for a larger child. The MacLiver '085 patent also fails to teach or suggest the use of a foot rest.

A review of child safety seat technology shows that a need exists for an apparatus that would allow a child to recline more comfortably in a safety seat. One goal of the invention herein is to provide an apparatus that assists in maintaining a child's body in a safe and proper orientation when the child is sitting in the safety seat. Of particular concern is ensuring the optimum position of the safety seat and preventing compromise to neck structures (e.g., airway, neuro-vascular structures, or muscular-skeletal structures) while the child sleeps in the seat and potentially in the case of sudden stops or accidents. A further need exists for an apparatus that safely restrains a child in a safety seat while providing a foot support to prevent a child's legs from dangling downward for prolonged periods of riding.

The devices shown in the prior art further fail to provide any cushioning or protective padding for a child's legs as they hang below the standard car seat. In the case of an accident, the child's legs are vulnerable to shearing forces that could cause serious injury. A need exists in the art for an apparatus that provides a child a secure foot rest while simultaneously protecting the child's legs from harm.

SUMMARY OF THE INVENTION

The invention is a support apparatus for a child's safety seat. The support apparatus includes a base portion, an upper portion connected to one end of the base portion, and a bottom portion connected to an opposite end of the base portion. The upper and bottom portions may be attached to the base by adjustable hinges, or they may be attached in a fixed position. A foot support is attached to the bottom portion.

The bottom portion serves as a platform for the foot rest and as a supporting element for the child safety seat support apparatus. The bottom portion is designed to be adjustably elongated so that the bottom portion comes into contact with the floor of a vehicle. The bottom portion preferably engages the vehicle floor at an angle, creating a horizontal force vector that aids in prevention of forward movement of the support apparatus.

The bottom portion is also designed to provide a degree of rigidity sufficient to produce a stable upward force vector. In this manner, the child safety seat support apparatus aids in tilting an associated car seat, specifically the back portion of the car seat, to an inclined position. This position prevents a child's head from falling forward when asleep.

In one embodiment, the bottom portion is removable for convenient storage. A removable bottom portion may be attached as shown in FIG. 11, or in a different embodiment shown in FIG. 12, an attachment mechanism such as Velcro® may be used to attach a bottom portion to an existing car seat as an after-market add-on feature to the car seat. Of course, an add-on type of bottom portion would optionally include all of the features described above for the overall apparatus.

It may also be desirable to replace the legs shown in FIG. 11 with a different feature that engages the floor of the vehicle. For example, the legs used as extension devices on the support apparatus may be replaced with a removable engagement block that attaches to the bottom portion and is adjustable to maintain a desired height and orientation of the bottom portion in relation to the car seat. Certain embodiments may utilize Velcro® to attach and detach the engagement block to the bottom portion. Velcro® is merely one option for attachment as the block may be fixed to the car seat via various connectors, including but not limited to standard nuts and bolts. The engagement block may be attached to the front side of the bottom portion to serve a dual purpose as a foot rest or as a step for assisting the child getting into or out of the safety seat.

Thus, it is an object of the present invention to provide a child safety seat support apparatus having an upper portion adjustably connected to a base portion to recline a child safety seat in a safer, more comfortable position during automobile travel.

It is further an object of the present invention to provide a child safety seat support apparatus having a bottom portion adjustably extending from the base portion to the floor of a motor vehicle for increased rigidity, support, and comfort.

It is further an object of the present invention to provide a child safety seat support apparatus having an adjustable foot rest to enhance the child's comfort during automobile travel and to allow for a platform making ingress and egress from the car seat easier for a child to accomplish without being carried or lifted.

It is further an object of the present invention to provide a child safety seat support apparatus that may be used in conjunction with standard car seats to aid in positioning the car seats during use. These car seats include various extra features, such as the five point harness for holding children securely therein.

In yet another embodiment of the invention, the child safety seat support apparatus includes protective braces extending outwardly from the bottom portion of the apparatus to protect the legs of a child seated in the associated safety seat. In one embodiment, the foot rest extending from the bottom portion may extend between the protective braces so that the child is more comfortable and protected from accidental injury. For older children who have grown taller, the foot rests may be positioned below the protective braces. In fact, the foot rests may be attached to the engagement block of FIG. 13, closer to the vehicle floor. In other words, the position of the foot rests is not limited to that shown in the drawings, which are used only as examples.

The protective braces of this invention form channels in which a child places his legs when seated in the safety seat. In a different embodiment, the bottom portion of the apparatus includes a foot rest. As noted above, the foot rest may be positioned within the channels formed by three substantially parallel protective braces, or the foot rest may be positioned below the protective braces closer to the vehicle floor.

DETAILED DESCRIPTION

The invention is a child safety seat support apparatus for positioning a standard child safety seat (hereinafter "safety seat") on a vehicle seat.

As used herein, a vehicle includes all forms of transportation in which passengers may attach child safety seats to secure children while moving. Pursuant to this invention, a "safety seat" includes, but is not limited to, car seats and booster seats that are commonly available on the market today and in the future. The support apparatus is useful for adjusting the position in which a safety seat reclines on a vehicle seat. The support apparatus is adjustable to make a safety seat more comfortable on a wider variety of vehicle seats.

Figure 1:
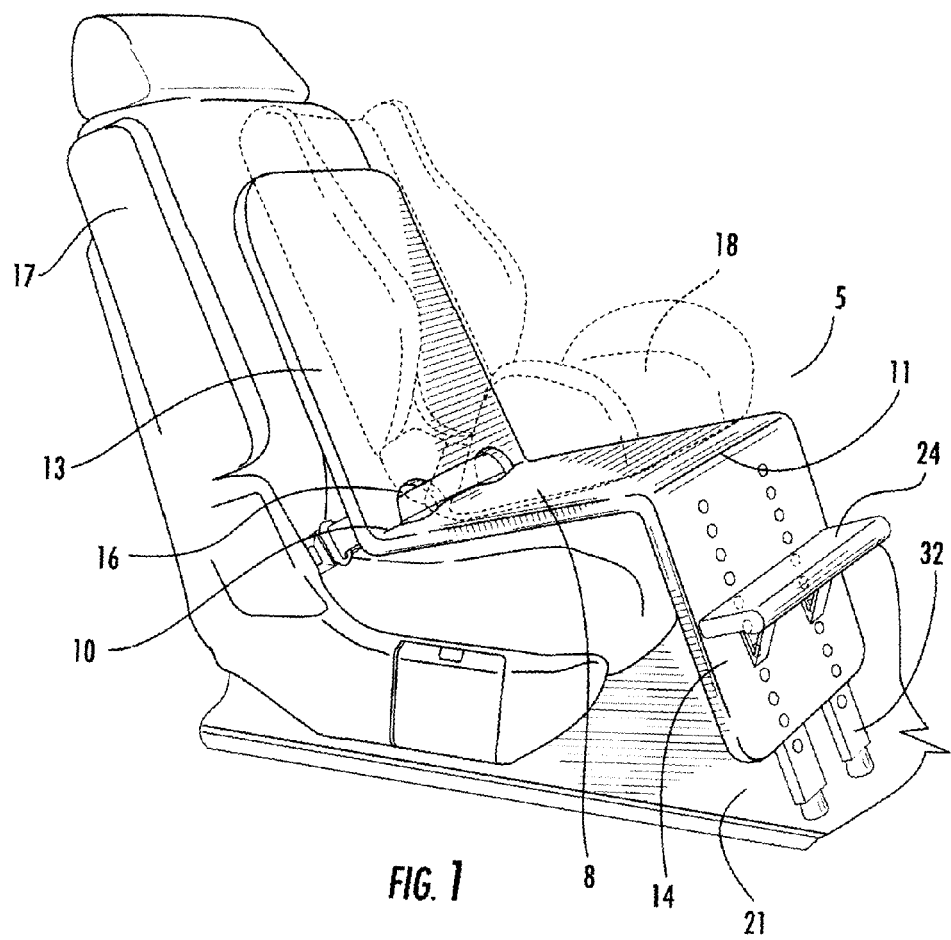
FIG. 1 is a side view of a single piece child safety seat support apparatus installed on a vehicle seat with a child safety seat thereon.

In one aspect, the support apparatus assists in securely tilting a safety seat to allow a sleeping child to remain in a reclined position safely. In vertically oriented safety seats, sleeping children often lean forward, which leads to cramps or even obstructions to breathing. The support apparatus 5 disclosed and claimed herein provides an apparatus for optimally positioning a safety seat 18 on a wide variety of vehicle seats to allow a child to ride more comfortably. The apparatus 5 is also useful in ensuring the optimum position of the safety seat 18 and preventing compromise to neck structures (e.g., airway, neuro-vascular structures, or muscular-skeletal structures) while the child sleeps in the seat and potentially in the case of sudden stops or accidents. The first embodiment, shown in FIG. 1, is a single piece child safety seat support apparatus 5. The support apparatus has a base portion 8 for placing on the seat 17 of a vehicle and receiving a child safety seat 18 thereon. The base portion 8 has a first end 10 and a second end 11. An upper portion 13 is connected to the first end 10 and extends upward at an angle relative to the base portion 8. A bottom portion 14 is connected to the second end 11 of the base portion 8. The bottom portion 14 extends downward at an angle relative to the base portion 8 and engages the floor 21 of the vehicle. A foot rest 24 extends from the bottom portion 14. The apparatus 5 may include anchor receptacles 16 as necessary to allow a seat belt or a safety seat anchor to hold the support apparatus 5 and a safety seat 18 in place. The anchor receptacles 16 may be formed by contoured openings between the base 8 and the upper portion 13. Instead of contoured openings, the support apparatus may have a latching system that engages anchors installed in the vehicle seats.

The base 8, the upper portion 13, and the bottom portion 14 together adjust the position in which the child safety seat 18 reclines on a vehicle seat 17. The single piece support apparatus 5 is placed on the vehicle seat 17 at a desired angle. A safety seat 18 is placed on top of the support apparatus 5 and will tilt in the direction provided by the support apparatus 5. Typically, the user will position the support apparatus 5 to allow the safety seat 18 to lean back so that a resting child in the safety seat 18 will be in a secure reclined position. Without the support apparatus 5 according to this invention, the back of a standard safety seat would be in a substantially vertical position. A child sleeping in a vertical safety seat will eventually lean forward in an uncomfortable and possibly dangerous position.

The support apparatus 5 of this invention provides a more comfortable and safer tilt to a safety seat 18 thereon. In order to provide this positional enhancement to a standard safety seat, the support apparatus 5 of FIG. 1 has the upper portion 13 connected to the first end 10 at an angle less than about 180 degrees relative to the base 8 (i.e., an upward angle). Similarly, the bottom portion 14 is connected to the second end 11 at an angle between about 180 degrees and about 360 degrees relative to the base 8 (i.e., a downward angle).

The support apparatus 5 according to FIG. 1 also includes a foot rest 24 so that a child in the safety seat can prop up his or her feet and legs. When riding in a safety seat for long periods, a child's dangling legs tend to cramp and become uncomfortable. Children in safety seats often raise their legs and push their feet against the seat in front of them to remedy this design deficiency. The invention herein includes the foot rest 24 to prevent such discomfort and cramping by giving the child an appropriately attached adjustable foot rest to obtain the proper height.

Adjusting the height of the foot rest is a practical concern in using the support apparatus 5 disclosed herein. The support apparatus 5 may be used in a variety of different vehicles, all of which have different seat structures and heights. Also, the child in the seat may be any number heights as well. The support apparatus 5, therefore, includes a mechanism for removably attaching the foot rest to the bottom portion 14.

Figure 2:
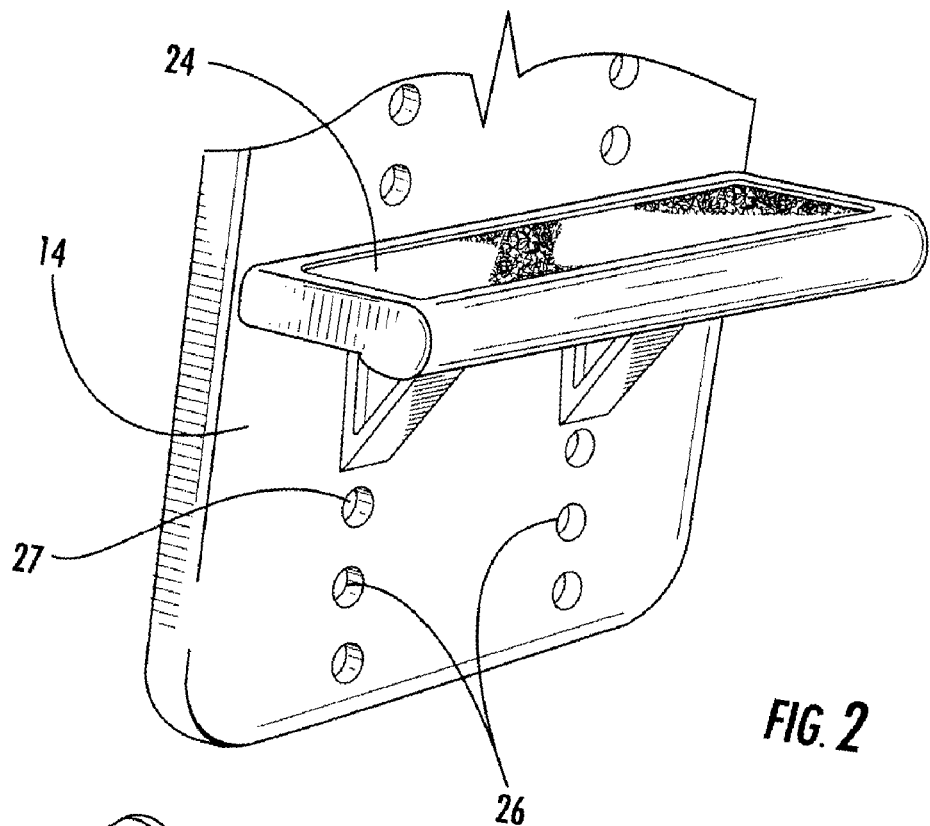
FIG. 2 is a front plan view of a bottom portion of the invented apparatus with a foot rest installed.

Without limiting the invention herein, FIG. 2 shows way of attaching the foot rests. The bottom portion 14 has a plurality of inner edges 26 defining attachment receptacles 27 within the bottom portion 14. The attachment receptacles 27 are vertically spaced from one another to provide a plurality of heights at which the foot rest 24 may be attached. The foot rest 24 may attach to the attachment receptacles 27 by any means. For example, the foot rest 24 may include at least one peg on its outer perimeter to place inside the attachment receptacles 27. Other standard bracketing mechanisms may be used to attached foot rest 24 to the bottom portion 14 as well.

The foot rest 24 may further include a pair of gussets 30 connected under a respective end of the foot rest 24 to support the foot rest 24 against the bottom portion 14. A gusset fastener, such as the above described peg, may be used to engage at least one of the attachment receptacles 27.

The support apparatus 5 may be used in a variety of the vehicles for transporting children. The support apparatus 5 may be adjustable to fit on different seats in a wide variety of modes of transportation. As shown in FIG. 1, the support apparatus 5 is a single piece construction. The support apparatus 5 of FIG. 1, therefore, may optionally include an extension device 32 to ensure that the support apparatus 5 will engage the vehicle floor 21. One benefit of the support apparatus according to the invention herein is that the bottom portion 14 engages the vehicle floor 21 and provides an upward vector of force to support the apparatus 5.

The support apparatus 5 includes contours to define anchor points 16 through which a standard seat belt or seat anchor may engage a safety seat 18. In this fashion, the support apparatus 5 is securely held between the vehicle seat 17 and the safety seat 18. The extension device 32 provides an upward vector of force to hold the support apparatus 5 at a desired angle.

The extension device 32 includes a way of making of faith of adjustments to the length of the bottom portion 14 of the support apparatus 5. Without limiting the invention herein, the term "coarse adjustment," means changing the position of the extension device 32 in relation to the bottom portion 14 by fixed amounts that are previously set within the structure of the bottom portion. In other words, the invention encompasses a way of shortening or lengthening the extension device 32 in relation to the bottom portion by a primary adjustment mechanism.

Similarly, the term "fine adjustment" means changing the position of the extension device 32 in relation to the bottom portion 14 by smaller and more selective increments than those described as "coarse adjustments". The fine adjustment mechanism is then a secondary way of changing the position of the extension device between the bottom portion 14 and a vehicle floor 21.

Figure 3:
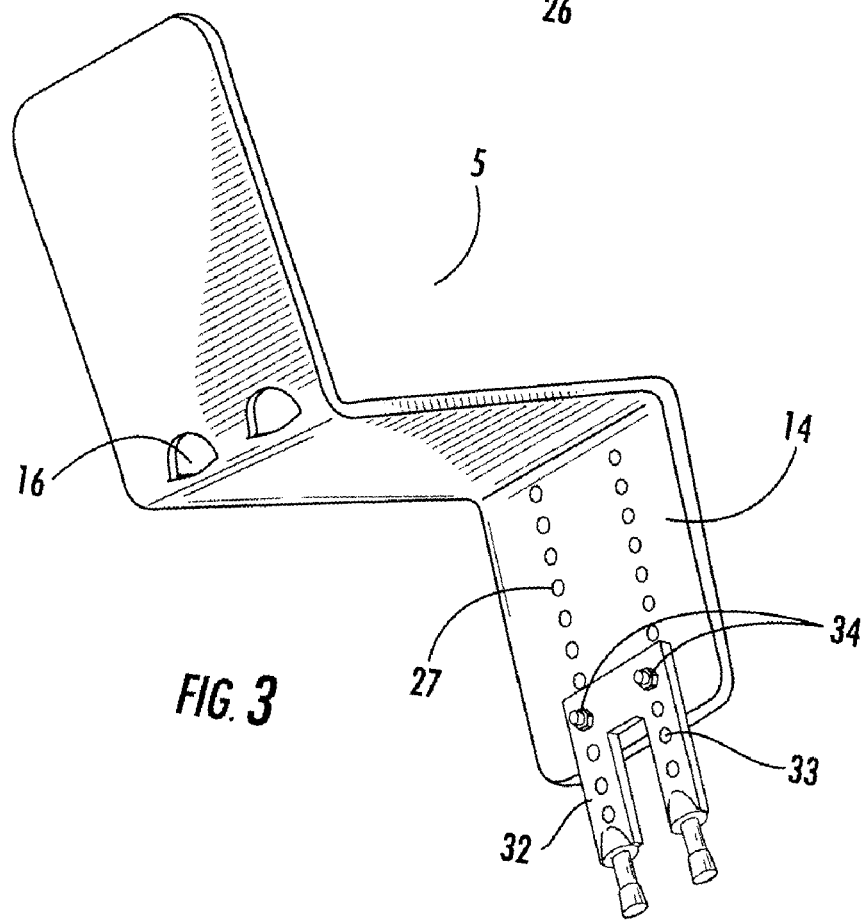
FIG. 3 is a rear view of a single piece support apparatus with an extension device attached to the bottom portion as shown.

FIG. 3 shows one example of an extension device 32 connected to the bottom portion 14 of the apparatus 5. In this example, the extension device 32, includes fastening points 33. The extension device 32 is connected to the backside of the bottom portion 14 by engaging an adjustable fastener 34 between the fastening point 33 and the attachment receptacle 27 of the bottom portion 14. The fastening point on the extension device may be a hole similar to the above described attachment receptacle 27.

The extension device 32, therefore, may be attached at any of the heights provided by the attachment receptacles 27 of the bottom portion 14. The connection between the attachment receptacles 27 and the bracket 34 is one example of a coarse adjustment of the length of the extension device 32. The length of the extension device 32 may be "coarsely adjusted" by selecting an appropriate attachment receptacle 27 to affix the extension device to the bottom portion. The locations of the attachment receptacles 27 have been previously determined and set at fixed heights of the bottom portion.

The arrangement of FIG. 3 is only one example of providing coarse adjustment of the length of the extension device 32. In a different embodiment and without limiting the device herein, the coarse adjustment of the length of the extension mechanism 32 may be accomplished by a ratchet bar on the backside of bottom portion 14 and an engagement pawl on the extension device 32. The ratchet bar may include a plurality of curved receptacles in which the engagement pawl may securely rest at a selected height. The extension device may be moved into a higher or lower receptacle on the bottom portion 14 as desired.

Figure 4:
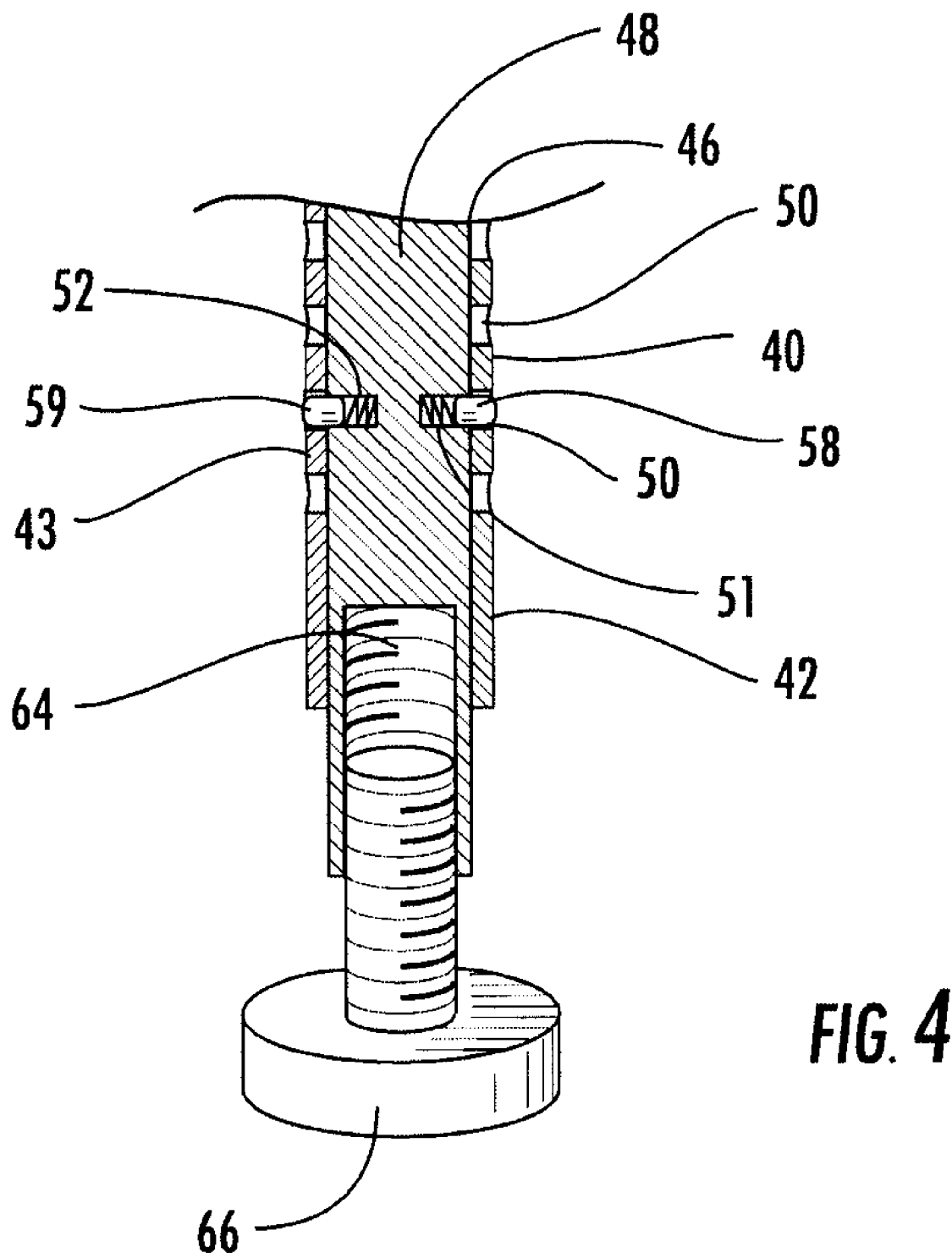
FIG. 4 is a side view of an enclosed cavity of a bottom portion of a child safety seat support apparatus with an extension device placed therein and a length adjustment screw engaging a threading therein.

The bottom portion 14 of the support apparatus 5 may be designed to engage the extension device 32 in other convenient ways. FIG. 4 shows another embodiment of the bottom portion of the apparatus 5. FIG. 4 is a side view of a bottom portion 40 that may be used in the same fashion as the previously discussed bottom portion 14. In FIG. 4, the bottom portion 40 engages an extension device 48 from the inside of the bottom portion 40.

In this embodiment, the bottom portion 40 is a rectangular enclosure with a front face 42 and a rear face 43. The front and rear faces 42, 43 are connected by two side faces, a top face, and a bottom face to define a cavity 46 therein. An extension device 48 slides into the cavity 46 of the bottom portion 40.

The bottom portion 40 of FIG. 4 has a plurality of inner edges 50 defining pairs of coaxial holes 51, 52 in the respective front face 42 and rear face 43. The extension device 48 slides into the cavity 46. The extension device has a pair of coaxial spring pins 58, 59 that releasably engage a selected pair of coaxial holes 51, 52 in the bottom portion 40. The spring pins 58, 59 may be locked in place at a selected height within the bottom portion 40.

The apparatus 5 may also include a way to achieve fine adjustment of the length of the extension device 48. The fine adjustment allows the user to ensure a secure engagement between the extension device 48 and a vehicle floor.

As shown in FIG. 4, the fine adjustment means may include, but is not limited to, a threading 64 within the extension device 48. The threading 64 extends from the bottom of the extension device 48 into the interior of the extension device. A length adjustment screw 66 engages the threading 64 to brace the extension device against a vehicle floor 21. The length adjustment screw 66 may be loosened or tightened as necessary.

The support apparatus shown in FIGS. 1-4 is simple to operate. The user places the single piece support apparatus 5 on a vehicle seat 17. The apparatus 5 may be positioned at an angle as required by the seat design to hold a child safety seat at a desired angle. The extension device 32 or 48 attaches to the apparatus 5 to provide a secure engagement between the bottom portion 14 or 40 of the apparatus 5 and the vehicle floor 21.

Depending on the height of the seat, the extension device 32 or 48 may be connected to the bottom portion 14 at a selected position. The positions available for attaching the extension device provide a mechanism for coarsely adjusting the length of the extension device. A mechanism for fine adjustment of the extension device, such as a length adjustment screw, may be tightened or loosened as necessary to securely engage the vehicle floor 21.

Figure 5:
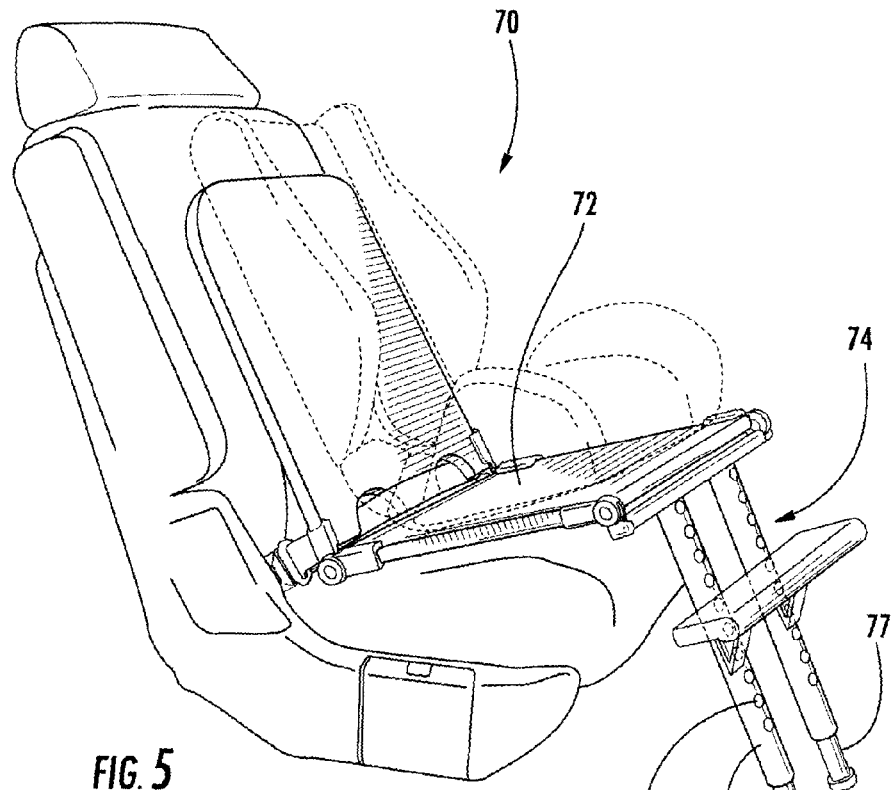
FIG. 5 is a side view of a child safety seat support apparatus with adjustable legs.
Figure 6:
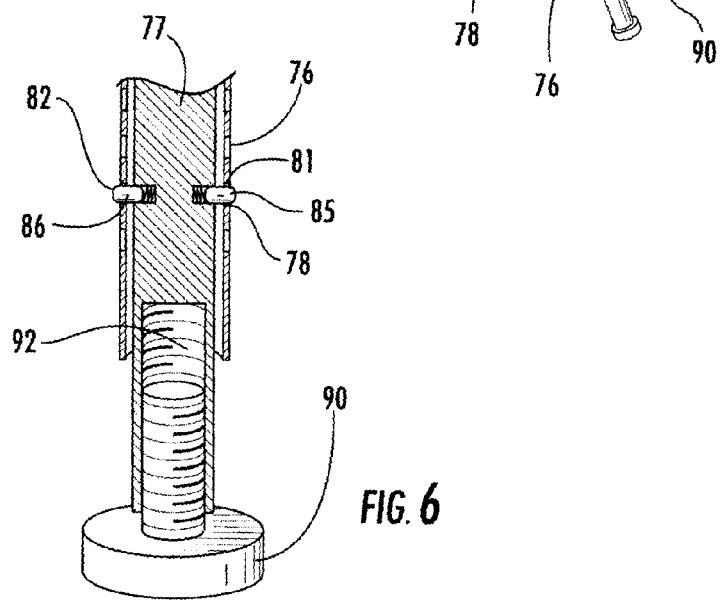
FIG. 6 is a cross section view of one adjustable leg of the bottom portion of a child safety seat support apparatus.

The bottom portion 14 of the apparatus 5 may also be designed as shown in FIG. 5. The bottom portion 74 of FIG. 5 has at least one adjustable leg 76 extending from the base 72 of the support apparatus 70. As shown in FIG. 6, the adjustable leg 76 is hollow to define a cavity therein. An extension device 77 slides into the cavity of the leg 76. In this design, the extension device 77 is a telescoping attachment that slides into the leg 76 and locks into any of several available positions. As used herein, the term "telescoping" means, without limitation, that one part slides into the interior of another part, as in typical telescope designs.

One mechanism for locking the telescoping extension device 77 into the leg 76, is shown in FIG. 6. In FIG. 6, the leg 76 has a plurality of inner edges 78 defining coaxial holes 81, 82 positioned opposite one another. Similar to the embodiment of FIG. 4, the extension device 77 includes a pair of coaxial spring pins 85, 86. The spring pins 85, 86 releasably engage the coaxial holes 81,82 within the leg 76 to lock the extension device 77 in a selected position. The spring pin and hole configuration is just one example of a mechanism for locking the telescoping extension device 77 in place. Other locking means are within the scope of the invention herein.

As discussed in relation to FIG. 4, a length adjustment screw may be included within the extension device 77 of FIG. 6. The length adjustment screw 90 once again provides a way to tighten the engagement between the extension device 77 and a vehicle floor 21. The extension device 77 includes a threading 92 to receive the length adjustment screw 90.

The support apparatus disclosed and claimed herein allows the user to adjust the tilt at which a child safety seat reclines on the seat of a vehicle. Regardless of the seat design or the height of the seat, the support apparatus allows the user to position a child safety seat as necessary to make the child more comfortable for longer periods of time.

Figure 7:
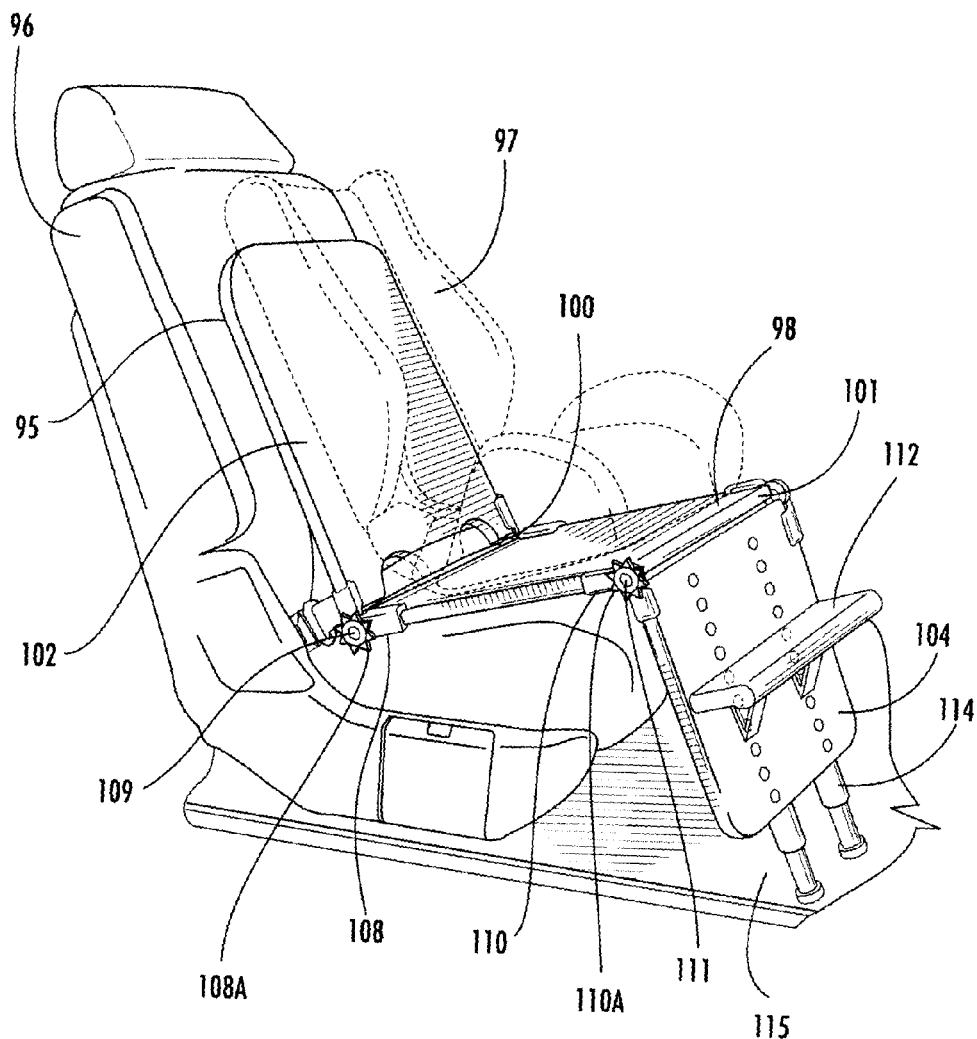
FIG. 7 is a side view of a child safety seat support apparatus with adjustable hinges connecting separable portions of the apparatus.

Another embodiment of this invention provides even more opportunity to adjust the angle at which a child safety seat tilts or reclines. As shown in FIG. 7, the support apparatus may be designed as modular pieces that conveniently fit together. The support apparatus 95 of FIG. 7 includes all of the features shown in FIGS. 1 through 6, except the base portion 98, the upper portion 102, and the bottom portion 104 are separable. As such, the previously described attributes of the support apparatus shown in FIGS. 1-6 will not be repeated but are incorporated herein as if fully set forth.

The support apparatus 95 of FIG. 7 includes an extra functionality in that the base portion 98, the upper portion 102, and the bottom portion 104 are separate pieces. The base portion 98 has a first end 100 and a second end 101. The upper portion 102 is connected to the first end 100 by at least one adjustable rear hinge 108. The upper portion 102 extends upward at an angle relative to the base portion 98. The hinge 108 allows the user to adjust the angle of the upper portion 102.

The bottom portion 104 is connected to the second end 101 of the base 98 by at least one adjustable front hinge 110. The bottom portion 104 extends downward relative to the base portion 98 and engages the floor 115 of a vehicle. A foot rest 112 extends from the bottom portion 104.

The modular design of support apparatus 95 provides even more latitude in positioning a child safety seat 97 on a vehicle seat 96. The front and rear hinges 108 and 110 each include respective retractable pins 109 and 111. The pins 109 and 111 may be removed, allowing the user to separate the base 98 from the upper portion 102 and the bottom portion 104. This is especially useful to remove the bottom portion 104 as necessary to increase cargo space beneath the vehicle seat 96. In fact, after a child safety seat 97 has been installed on the vehicle seat 96 with the support apparatus 95 under the safety seat 97, many users will leave the installation in place for extended periods. The bottom portion 104 may be removed temporarily by unhinging the bottom portion 104 from the base 98.

The adjustable hinges 108 and 110 may be any type of known hinge that is capable of locking at several different positions selected by the user. Typical hinges similar to those used on folding lawn chairs would suffice. The adjustable hinges 108 and 110 each have a plurality of positioning points 108A, 110A. The positioning points 108A and 110A are gear type projections in a ratchet hinge that hold the hinge at a selected position. Each positioning point available with the rear adjustable hinge 108 holds the upper portion 102 at a respective angle in relation to the base portion 98. The positioning points hold the upper portion 102 in respective positions between about 0 degrees and about 180 degrees in relation to the base portion 98.

At least one adjustable front hinge 110 allows for similar angular adjustment of the bottom portion 104. The adjustable front hinge 110 also has a plurality of positioning points 110A. Each positioning point 110A holds the bottom portion 104 at a respective angle in relation to the base 98. The positioning points hold the bottom portion 104 in respective positions between about 180 degrees and about 360 degrees in relation to said base.

The embodiment of FIG. 7 includes an adjustable foot rest 112 and an extension device 114. The bottom portion 104, the foot rest 112, and the extension device 114 may be designed to incorporate any or all of the features and functions previously discussed in relation to the embodiments of FIGS. 1-6. The features of the foot rest 112 and the extension device 114 will not be repeated herein, but are incorporated as if set forth in full.

One goal of the invention is to assist a user in positioning a child safety seat to the most comfortable angle for extended periods of riding. FIGS. 1-7 show a support apparatus for receiving the child safety seat on a base portion and an upper portion. The support apparatus described herein, however, may be designed to work equally well with a child safety seat adapted to receive only the bottom portion 14 or 104 to support the desirable angle of the child safety seat.

Figure 8:
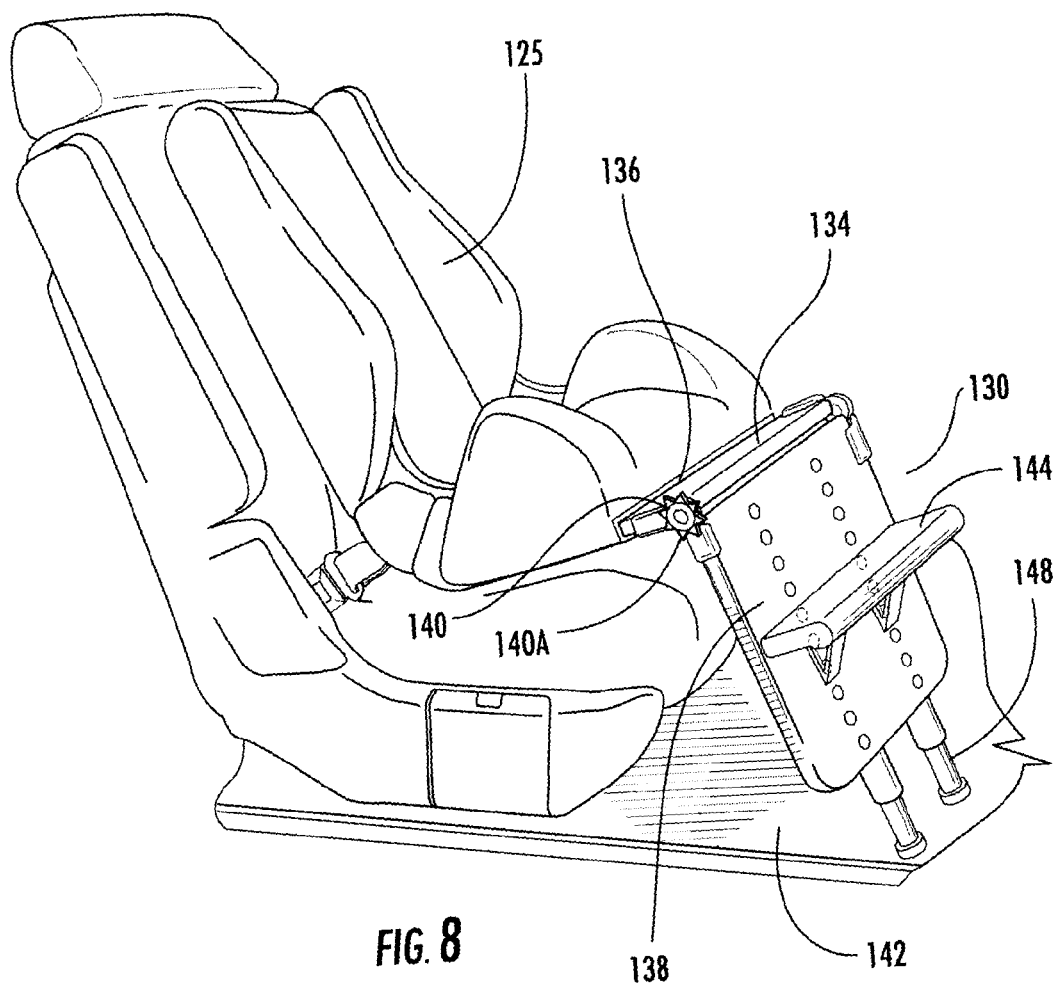
FIG. 8 is a side view of a child safety seat adapted to receive a child safety seat support apparatus with an adjustable hinge as shown.

FIG. 8 shows one configuration of a safety seat 125 adapted to receive a support apparatus 130. The support apparatus 130 has at least one projection end 134 for sliding into a receiving cavity 136 within the child safety seat 125. The receiving cavity 136 is not limited to the position shown in the drawings, but may be oriented for either vertical or horizontal assembly of the projection end. A floor brace 138 is connected to the projection end 134 by at least one adjustable hinge 140. The floor brace of FIG. 8 may include all of the features and functions of the bottom portions described previously. As such, those features will not be repeated. In an alternative embodiment, the floor brace 138 may be attached to the safety seat in a fixed position without the hinge 140.

The floor brace 138 engages the vehicle floor 142. The floor brace 138 provides an upward directed force vector against which the safety seat 125 bears downward. The upward directed force of the floor brace 138 allows the user to select an angle at which the child safety seat securely reclines.

As in the other embodiments of this invention, a foot rest 144 extends from floor brace 138. The foot rest 144 includes all of the features described for previously discussed foot rests 24 or 112. As such, these features will not be repeated herein but are fully incorporated by reference.

The floor brace 138 is connected to the projection end 134 by an adjustable hinge 140. As previously described, adjustable hinges are well known in the art. A ratchet type mechanism allows the adjustable hinge 140 to be locked in a plurality of selectable positions. The adjustable hinge 140 of FIG. 8, therefore, has a plurality of positioning points 140A that hold the floor brace 138 at a respective angle in relation to the projection end 134. As in prior embodiments, the positioning points hold the floor brace in a selected position between about 180 degrees and about 360 degrees in relation to the projection end 134.

The support apparatus 130 of FIG. 8 holds a child safety seat 125 in a desirable tilting position by engaging both the safety seat 125 and the floor 142 of the vehicle. The floor brace 138 may include an extension device 148 to allow adjustment between the floor brace 138 and the floor 142. The extension device 148 of FIG. 8 includes all of the features and functions of the extension devices 32, 48, 77, 114 discussed above. As such, the details of the extension device 148 will not be repeated for the support apparatus of FIG. 8.

Without limiting the invention, another goal of the support apparatuses of FIGS. 1-8 is to provide overall positioning capabilities to child safety seats in accordance with the invention herein. Each feature of this invention, as described above, may be incorporated into an overall safety seat. A safety seat according to this embodiment would not need a separate support apparatus as described and claimed herein. Instead, the features and functionality of the support apparatus 5, 95, 130 may be part of the safety seat itself. In this regard, and for example only, a safety seat would have seat, back, and foot portions corresponding to the respective base portion 8, the upper portion 13, and the bottom portion 14. All of the comfort and safety features of a standard child safety seat would then be available with the added feature of tilt adjustment. A child safety seat according to this invention would be angularly adjustable and include a foot rest for added functionality. Allowing a child safety seat to engage the floor of a vehicle is also desirable to add stability to the child safety seat installation.

Figure 9:
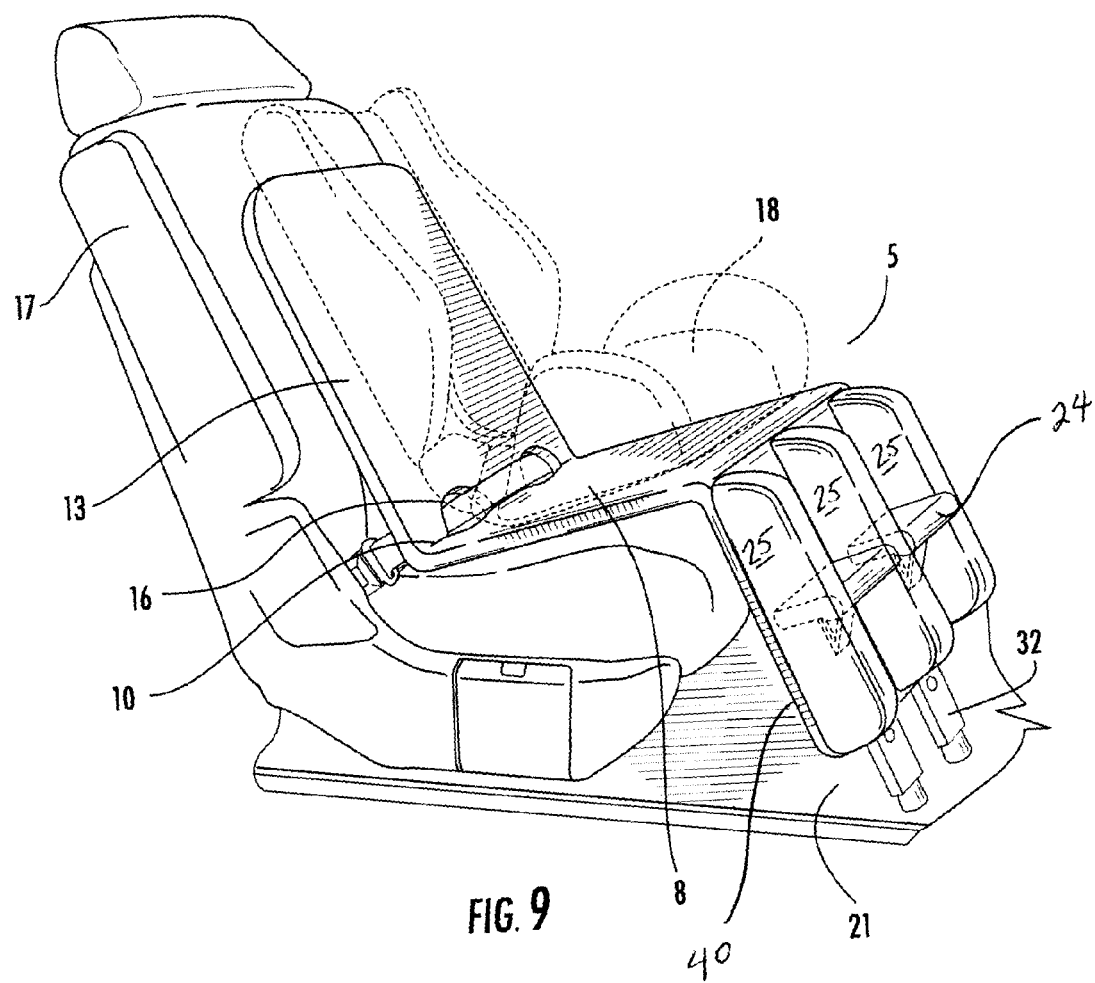
FIG. 9 is a side view of a child safety seat support apparatus with foot rests extending between protective braces for protecting a child's legs.
Figure 10A:
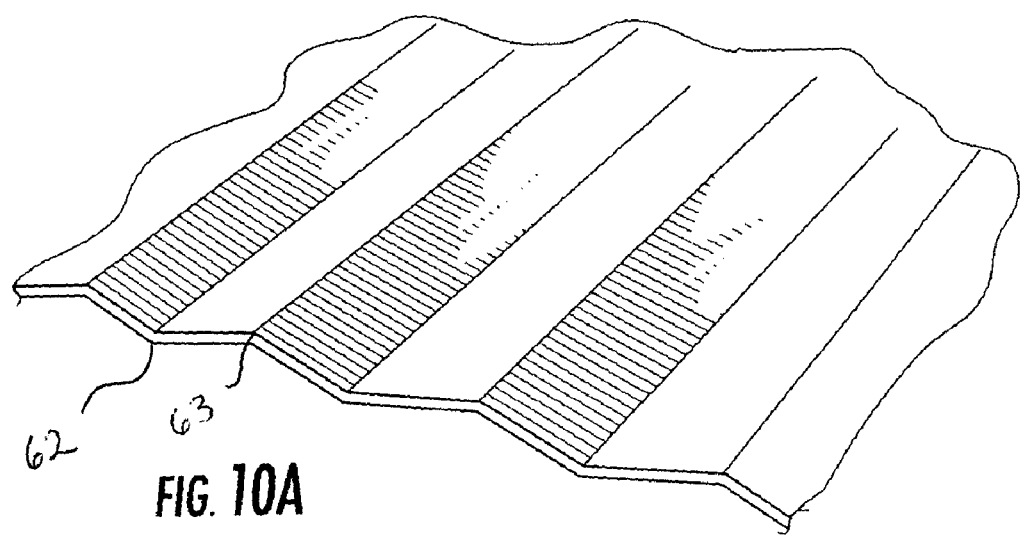
FIG. 10 is an illustration showing an accordion style deformation pattern for incorporating into the child safety seat support apparatus for shock absorption.
Figure 10B:
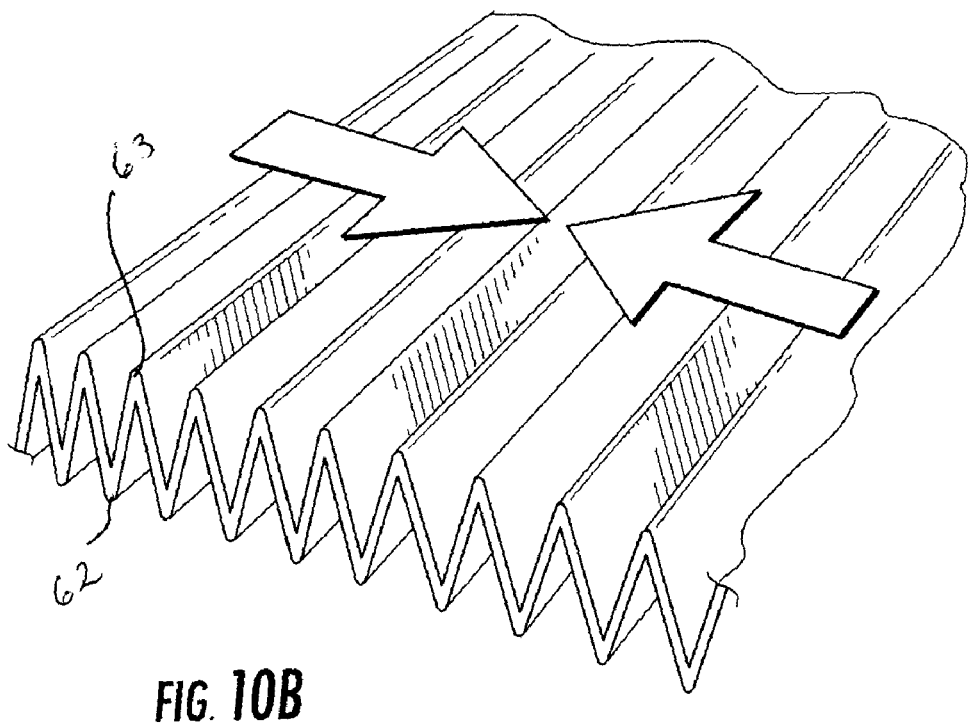
Figure 11:
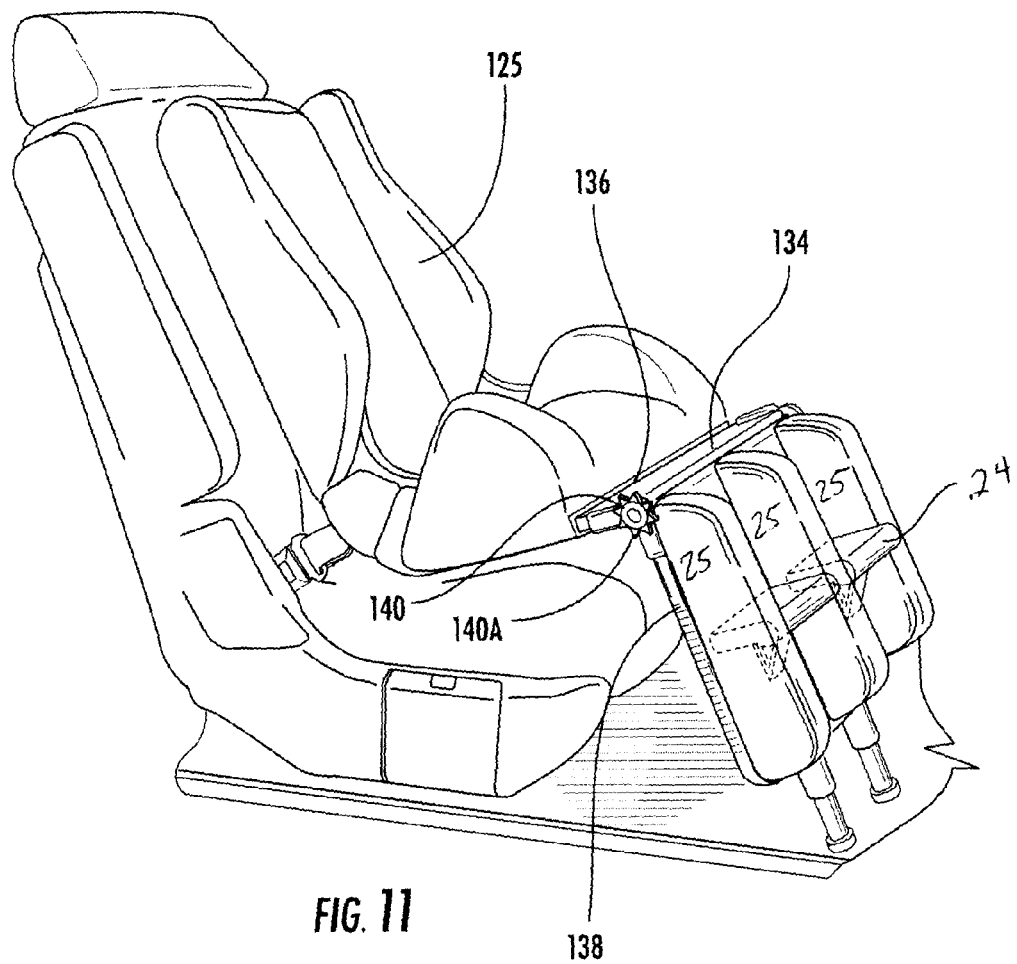
FIG. 11 is a side view of a child safety seat adapted to receive a child safety seat support apparatus having protective braces for protecting the child's legs.

FIGS. 9-11 show additional safety features of the support apparatus 5 in the form of protective braces 25 extending outwardly from the bottom portion 40 of the apparatus. The embodiments of FIGS. 9-11 optionally include all of the features discussed above with the added feature of leg protection.

When a child sits in the safety seat 18 shown in FIG. 9, the support apparatus 5 allows for re-positioning the child to a more comfortable posture. As noted above, the support apparatus 5 includes a base portion 8, upper portion 13, and bottom portion 40. Bottom portion 40 includes at least one pair of substantially parallel protective braces 25 extending outwardly from the bottom portion 40. The protective braces 25 protect the child's legs from side impact during an accident. The foot rest 24 described in earlier embodiments may extend between the protective braces 25 and may be positioned directly adjacent the braces. In different embodiments, the foot rests 24 may be adjustable for positioning the foot rests outside the protective braces 25 near the lower portion of the apparatus. As used herein and without limiting the invention, the term "adjustable," includes foot rests that are removable for repositioning at a different place on the bottom portion 40. Such repositioning would be achievable by using various temporary attachment mechanisms for holding the foot rests 24 in place (i.e., Velcro, nuts, bolts, pins, clips, etc.). In this embodiment, as a child grows taller, the foot rests could be moved to a lower point on bottom portion 40 to accommodate the child.

In a preferred embodiment, the bottom portion 40 includes at least one pair of protective braces 25 with a foot rest 24 extending across the bottom portion. The foot rest 25 may extent between the protective braces 25 or below the protective braces if the child is tall. In yet another embodiment, the bottom portion 40 comprises additional protective braces 25 extending substantially parallel to one another and forming channels in which a child places his legs. The protective braces 25 protect the legs from injuries associated with side impact collisions. The drawings herein show the child safety seat support apparatus 5 of this invention with a respective foot rest 24 within each channel. In this embodiment, each of the child's legs are protected on either side, and each of the child's feet has a respective foot rest 24. One should note, however, that the drawings are not limiting of the invention, and the foot rests may be located outside the protective braces 25 at the bottom of the apparatus.

The foot rest 24 is also useful to make ingress and egress from the car seat easier for a child to accomplish without being carried or lifted into the safety seat. Accordingly, embodiments of this invention using a foot rest 24 are also equipped with a step for the child to climb into and out of the seat.

The child safety seat support apparatus 5 is preferably made of a material that has strong shock absorption properties. In a preferred embodiment, shown in FIGS. 10A and 10B, the material making up the support apparatus has an accordion style deformation characteristic, i.e., an accordion deformation pattern. The term "accordion" is used in this document, without limitation, to show deformation upon impact in a systematic and planned compression along the lines shown in FIGS. 10A and 10B.

In this embodiment, as FIGS. 10A and 10B show, the child safety seat support apparatus 5 absorbs impact during a collision and protects the safety seat and the child even further. As shown in FIG. 10A, the child safety seat support apparatus 5 may be made of a shock absorbing material having a network of peaks 67 and valleys 68 that are made more extreme by collapsing on impact, as shown in FIG. 10B. In other words, the child safety seat support apparatus may include a series of integral tri-folds within the structure to absorb impact. The directional arrows in FIG. 10B show one scenario in which the child safety seat support apparatus 5 absorbs impact from both directions in a collision. The goal, of course, is to absorb the shock of impact in an accident to protect the safety seat and the child therein. Numerous polymers, mesh type substances, foam rubbers, and even metal may accommodate the preferred accordion style deformation characteristic for maximum shock absorption in the support apparatus. The use of inflatable parts is another option to achieve shock absorption. Any or all parts of the child safety seat support apparatus (i.e., the base, upper, or bottom portions) may be made of the shock absorbent material. While the child safety seat and/or the support apparatus may be made of appropriate shock absorbing materials, one should note that the term "shock absorbing material" includes without limitation those materials that are sufficiently rigid to serve a useful purpose. In particular, the shock absorbing material used in this invention is capable of withstanding downwardly directed forces during use. The materials used in making either the safety seat or a safety seat support apparatus of this invention include layered fabrication that incorporates rigid bodies in one portion with softer, more pliable materials thereon. One should further note that the term "shock absorbing material" includes, without limitation, embodiments which are inflatable such that sealed air pockets absorb shock as necessary to protect the child.

The bottom portion 40 is also designed to provide a degree of rigidity sufficient to produce a stable upward force vector. In this manner, the child safety seat support apparatus 5 aids in tilting an associated car seat 18, specifically the back portion of the car seat, to an inclined position. This position prevents a child's head from falling forward when asleep.

Figure 12:
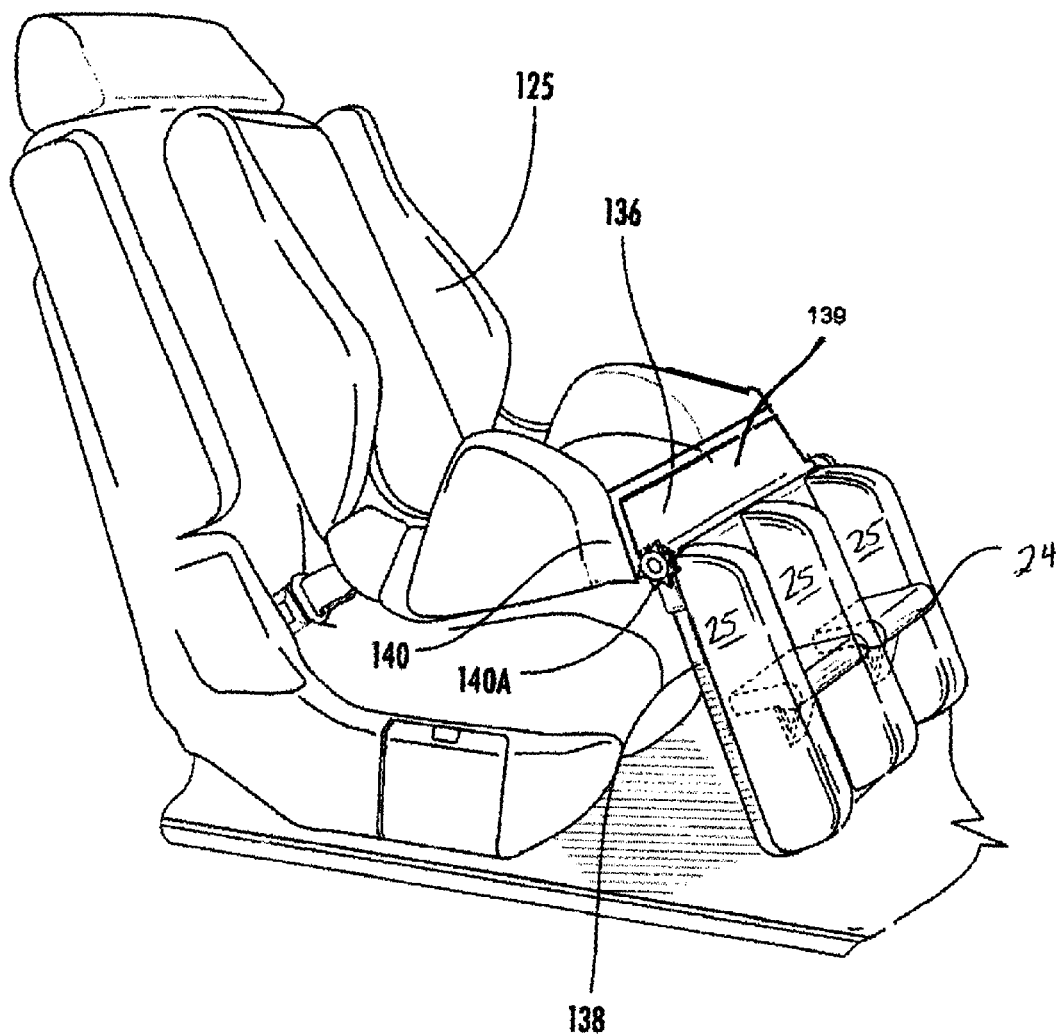
FIG. 12 is a side view of a child safety seat on which a bottom portion according to this invention has been added as an after-market accessory.

In one embodiment, the bottom portion 40 is removable for convenient storage. For clarity, a removable bottom portion 40 may be referred to as a floor brace 138 in accordance with prior disclosure. A removable bottom portion 138 may be attached as shown in FIG. 11, or in a different embodiment shown in FIG. 12, an attachment mechanism 139 may incorporate features such as Velcro® to attach the bottom portion 138 to an existing car seat 125 as an after-market add-on feature to the car seat 125. Alternatively, the attachment mechanism 139 may allow a bottom portion 138 to be attached to an existing, "off the shelf" car seat via nuts, bolts, pins, and the like. In FIG. 12, the attachment mechanism 139 is a flap or strip that conveniently fits across the bottom of the safety seat 125. A child sitting in the safety seat 125 places their legs over the attachment mechanism and within the channels formed by the protective braces 25. Of course, an add-on type of bottom portion, or floor brace 138, would optionally include all of the features described above for the overall apparatus.

It is important to note that the child safety seat support apparatus of FIGS. 9-13 includes the numerous adjustable features described above. For example, and without limitation, the height of the bottom portion 40, 138 may be adjusted for a suitably secure engagement with the floor of the vehicle. The foot rests 24 are also adjustable to conform to the appropriate height of the child. In one preferred embodiment, the foot rests 24 and the protective braces 25 may be modular and arranged in the most convenient positions, such as by attaching with Velcro® or other suitable temporary attachment mechanism. These temporary attachments allow the protective braces 25 and the foot rests 24 to be moved about the bottom portion to positions that fit children of various shapes and sizes.

It is important to note that the features described above in regard to FIGS. 9-13 may be implemented within a car seat itself. As discussed previously, it is within the scope of this invention for a car seat to have a base, upper portion, and bottom portion that engages the floor of an associated vehicle. The bottom portion of the car seat would then have modular, or adjustable, pieces including the above-described protective braces 25 and foot rests 24 with shock absorption capabilities.

FIG. 11 shows an embodiment of the invention, similar to that of FIG. 8, in which the child safety seat 125 includes a receptacle 136 and associated mechanisms for receiving a modular version of the bottom portion, or floor brace 138, of the support apparatus therein. The support apparatus 130 has at least one projection end 134 for sliding into a receiving cavity 136 within the child safety seat 125. A removable bottom portion, or floor brace 138, is connected to the projection end 134 by at least one adjustable hinge 140. The floor brace of FIG. 11 may include all of the features and functions of the bottom portions described previously. As such, those features will not be repeated. In an alternative embodiment, the floor brace 138 may be attached to the safety seat in a fixed position without the hinge 140.

The floor brace 138 engages the vehicle floor 142. The floor brace 138 provides an upward directed force vector against which the safety seat 125 bears downward. The upward directed force of the floor brace 138 allows the user to select an angle at which the child safety seat securely reclines.

In accordance with FIGS. 9 and 10, the embodiment of FIG. 11 includes the protective braces 25 and foot rests 24 described above. As such, those features will not be repeated herein. Suffice it to say, however, that the child safety seat 125 incorporates a bottom portion 138 for protecting the legs of a child in the safety seat 125. The bottom portion 138 includes at least one pair of protective braces 25 extending outwardly from the bottom portion 138 to form a channel in which the child's legs fit when the child is seated in the safety seat 125. Foot rests 24 provide additional functionality and comfort. The foot rests 24 and the overall height of the bottom portion 138 may be repositioned in accordance with mechanisms set forth in the above disclosure. Accordingly, the foot rests 24 may be located either within the protective braces 25 or below the braces, depending on the height of the child.

Figure 13:
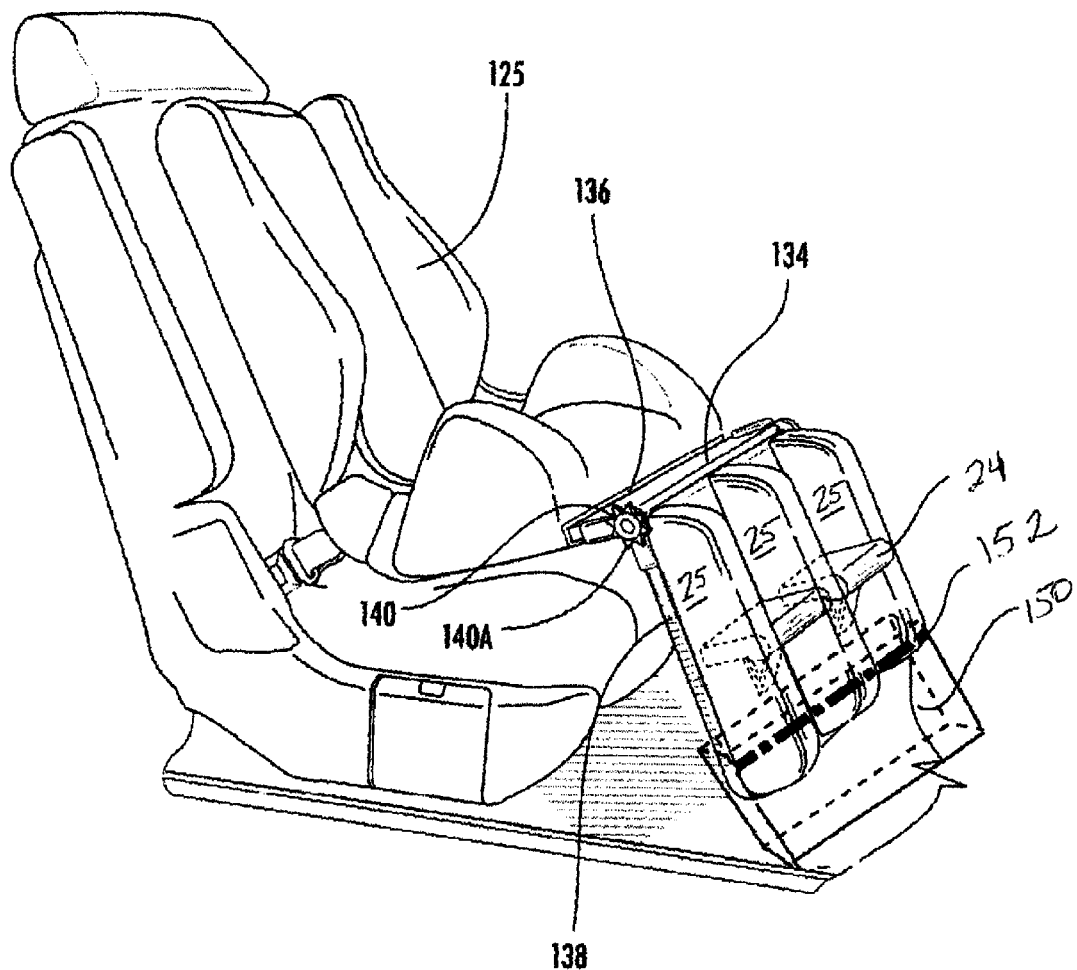
FIG. 13 is a side view of a child safety seat according to this invention in which the extension device is an engagement block for bracing against the vehicle floor.

It may also be desirable to replace the legs shown in FIG. 11 with a different feature that engages the floor of the vehicle. For example, FIG. 13 shows that the legs used as extension devices on the support apparatus may be replaced with a removable engagement block 150 that attaches to the bottom portion, or floor brace 138, and is adjustable to maintain a desired height and orientation of the bottom portion 138 in relation to the car seat 125. In other words, engagement block 150 is yet another kind of extension device for use with the invention herein. Certain embodiments may utilize a Velcro® strip 152 to attach and detach the engagement block 150 to the bottom portion 138. Velcro® is merely one option for attachment as the block may be fixed to the car seat via various connectors, including but not limited to standard nuts and bolts. The engagement block 150 may be used in any embodiment described herein, including as an after-market addition to an existing car seat. In each case, the engagement block 150 may be attached to the back of the bottom portion 138 as shown in FIG. 12, or the engagement block may be attached to the front side of the bottom portion 138. When attached to the front, the engagement block 150 may be used as a step to help a child get into or out of the car seat 125. In a different embodiment, the engagement block 150 may be used as a foot rest for the child sitting in the seat.

In the drawings and the specification, typical embodiments of the invention have been disclosed. Specific terms have been used only in a generic and descriptive sense, and not for purposes of limitation. Unless otherwise noted, the inventor is not acting as a lexicographer, and terms herein are intended to have their ordinary meaning. For example, and without limitation, the term "adjustable" as used herein includes the broadest interpretation of that term including synonyms such as removable. The invention is not restricted to the slavish imitation of each and every detail set forth above. Obviously, devices may be provided which change, eliminate, or add certain specific details without departing from the scope of the invention. The scope of the invention is set forth in the following claims.

The invention claimed is:

1. A child safety seat support apparatus, comprising:
    a base portion for receiving a child safety seat thereon, said base portion having a first end and a second end opposite said first end;
    an upper portion connected to said first end and extending upward at an angle relative to said base portion;
    a bottom portion connected to said second end and extending downward at an angle relative to said base portion, said bottom portion engaging the floor of a vehicle; and
    at least two protective braces extending outwardly from said bottom portion and forming a channel there between for holding a child's legs;
    a foot rest extending outwardly from said bottom portion;
    wherein said base, said upper portion, and said bottom portion adjust the position in which a child safety seat reclines thereon.

2. A child safety seat support apparatus according to claim 1, further comprising an extension device attached to said bottom portion for engaging the vehicle floor.

3. A child safety seat support apparatus according to claim 2, wherein the position of said extension device is adjustable.

4. A child safety seat support apparatus according to claim 3, wherein said extension device is an engagement block for contacting the vehicle floor.

5. A child safety seat support apparatus according to claim 3, wherein the position of said foot rest is adjustable.

6. An apparatus according to claim 5, wherein opposite ends of said foot rest are directly adjacent each respective protective brace.

7. An apparatus according to claim 1, further comprising an additional protective brace extending outwardly from said bottom portion and positioned between said two protective braces, the protective braces defining two substantially parallel channels.

8. An apparatus according to claim 7, comprising a respective foot rest in each channel, wherein each foot rest extends between a pair of protective braces.

9. An apparatus according to claim 7, wherein said foot rest extends across said bottom portion below said channels.

10. An apparatus according to claim 1, wherein the child safety seat support apparatus comprises a shock absorbing material.

11. An apparatus according to claim 10, wherein said shock absorbing material is in the form of an inflatable apparatus.

12. An apparatus according to claim 10, wherein said base portion comprises a shock absorbing material.

13. An apparatus according to claim 10, wherein said bottom portion comprises a shock absorbing material.

14. An apparatus according to claim 10, wherein said protective braces comprise a shock absorbing material.

15. An apparatus according to claim 10, wherein said shock absorbing material has an accordion deformation pattern.

16. A child safety seat comprising a support apparatus according to claim 1.

17. A child safety seat according to claim 16, wherein said support apparatus is integral with the body of the child safety seat.

18. A child safety seat for holding a child on a seat base portion during vehicular transportation, the safety seat comprising a bottom portion connected to the seat base portion, wherein the bottom portion protects the legs of the child in the safety seat.

19. A child safety seat according to claim 18, wherein the bottom portion is removably connected to the safety seat by an attachment mechanism.

20. A child safety seat according to claim 18, wherein said bottom portion comprises:
   at least one pair of protective braces extending outwardly from the bottom portion to form a channel in which the child's legs fit when the child is seated in the safety seat.

21. A child safety seat according to claim 18, wherein said bottom portion comprises a foot rest to assist a child with ingress into the safety seat and egress from the safety seat.

22. A child safety seat according to claim 21, further comprising an adjustable engagement block for contacting the vehicle floor and adjusting the position of the safety seat.

\* \* \* \* \*